United States Patent
Nicklin et al.

[15] 3,649,169
[45] Mar. 14, 1972

[54] TREATMENT OF GASES

[72] Inventors: Thomas Nicklin, Middleton, Manchester; Frederick Farrington, Sale, both of England

[73] Assignee: The Gas Council, London, England

[22] Filed: June 4, 1969

[21] Appl. No.: 830,511

[52] U.S. Cl. ............................ 23/25, 23/181, 252/467
[51] Int. Cl. .................................................. B01d 53/34
[58] Field of Search ............... 23/2.1, 3.1, 4, 181; 252/467

[56] References Cited

UNITED STATES PATENTS 1,947,776  2/1934  Huff et al. ................................ 23/2
2,956,861  10/1960  Garlet .................................. 23/2 X

*Primary Examiner*—Earl C. Thomas
*Attorney*—Watson, Cole, Grindle & Watson

[57] ABSTRACT

Removal of organic sulphur compounds, carbon disulphide and carbon oxysulfide, from inorganic gases, such as air, or exhaust gases, polluted therewith, is effected by contacting a mixture of steam and the gases to be treated with a catalyst comprising uranium oxide, and, preferably a carrier such as alumina.

4 Claims, No Drawings

TREATMENT OF GASES

The invention relates to the treatment of gases to remove impurities therefrom; in particular the invention relates to the removal of organic sulphur compounds and/or carbon oxysulphide (COS) and/or carbon disulphide from inorganic gases (and vapors).

By the term "inorganic" when used to qualify the words "gas" or "vapor" is meant a gas which contains no appreciable amount of hydrocarbons.

According to the present invention there is provided a process for the treatment of inorganic gases to remove therefrom sulphur-containing compounds of the group consisting of organic sulphur compounds, carbon oxysulphide and carbon disulphide, which process comprises the steps of contacting a mixture of steam and the gases to be treated, with a catalyst comprising an oxide of uranium, whereby the sulphur present in said sulphur-containing compounds is converted into hydrogen sulphide.

The catalyst may be employed supported on a stable carrier, such as aluminum oxide. Other carriers which may be employed are silica, kaolin, powdered brick, and alkaline earth metal oxides such as the oxides of magnesium, calcium, strontium and barium. The catalyst and/or the preparation thereof may conveniently be as described in U.S. Letters Pat. No. 3,475,328. It is however to be appreciated that the catalyst need not be supported on a stable carrier as described in this specification.

Particularly active catalysts for use in the process of the present invention may be prepared by a method comprising the step of forming an organic carboxylic acid salt of uranium, such as uranium acetate, on a catalyst carrier and thereafter decomposing said salt at a temperature not greater than 650° C. preferably 550° C. or less, to produce an oxide or oxides of uranium. Other carboxylic acid salts may be used, such as the oxalate or formate or, for example, salts of carboxylic acids having up to eight or 12 carbon atoms per molecule. It will be appreciated that if the catalyst is to be prepared by impregnating a catalyst support with a solution of a uranium carboxylic acid salt, it will be necessary to select an appropriate solvent. Usually suitable solvents will be organic if the carboxylic acid salt present is not a formate.

Preferably the catalyst carrier, on which has been formed the carboxylic acid salt of uranium, is heated slowly so that its temperature rises gradually up to its decomposition temperature. A suitable rate of heating may be in the range of from 5° to 15° C., or preferably about 10° C., per minute.

For a specific example of a catalyst composition prepared by the controlled decarboxylation of a uranium carboxylic acid salt, reference may be made to that part of Example I in Belgian Pat. specification No. 700,310, which describes a catalyst containing uranium oxide, formed by the decomposition of uranium acetate. It will be appreciated that, in catalyst compositions for use in the process of the present invention, the presence of Nickel or its compounds, which are included in the catalyst described in the above-identified example, is not necessary.

It may be preferred that the uranium trioxide and/or uranoso-uranic oxide content of the catalyst is from 1 to 80 percent and desirably from 5 to 20 percent based on the total weight of the catalyst. In certain cases it may be even more preferred to use a catalyst having a content of the said uranium oxides of from 5 to 10 percent by weight.

It is to be understood that in carrying out the process of the invention the catalyst may be formed in situ, for example by employing in the reaction vessel a carrier impregnated with uranyl nitrate which, on being heated to a temperature in excess of 140° C., will be converted into $UO_3$ or $U_3O_8$ on the carrier. Heating the material to temperatures in excess of 300° to 400° C. will convert at least part of the $UO_3$ to $U_3O_8$.

The reaction may be conveniently effected at elevated temperatures, for example 275° to 500° C.; it may however be preferred to effect the reaction at a temperature of from 420° to 480° C. The reaction may be carried out at any desired pressure. In certain cases it is convenient to employ atmospheric pressure although higher pressures such as 25 or 50 atmospheres may be employed. The hydrogen sulphide which is produced by the process of the invention may be removed by any convenient means for example by bringing the gases into contact with zinc oxide.

It will be seen from the foregoing that the process of this invention may be used to remove sulphur-containing compounds from gas streams which are to be further processed and in which the sulphur compounds are undesirable. In a particular application of the invention, carbon oxysulphide can be removed from mixtures of carbon dioxide and carbon monoxide. The process of the invention may also be used to purify exhaust gases from various processes such as rubber vulcanizing, artificial fibers production, and tar distillation. The process of the invention may also be used to purify air in atmospheres polluted with the treatable sulphur compounds.

Following is a description by way of example of processes in accordance with the invention.

EXAMPLE

This example is concerned with the removal of COS from a gas consisting essentially of 60 percent by volume $CO_2$ and 40 percent by volume CO. The COS content of this feed gas was 300 grains/100 ft$^3$. The $CO_2$/CO mixture containing the COS was admixed with about three times the minimum amount of steam which was required to convert the sulphur in the COS to $H_2S$. The gas to be treated under steam was then passed through an externally heated tube which contained a uranium containing catalyst. This catalyst is in accordance with the methods described in U.S. Letters Pat. No. 3,475,328. The catalyst was supported on $Al_2O_3$ and contained about 10 percent by weight of uranium oxide. After the gas to be treated had been passed through the catalyst, it was cooled and treated with an absorber for $H_2S$.

In order to determine the amount of COS in the treated gas, it was admixed with hydrogen and passed over a Nimox catalyst at 400° C. The $H_2S$ thus produced was measured by Drager tubes.

The experiment described above was carried out at atmospheric pressure.

The results obtained from carrying out the above procedure are as follows:

TABLE

| Test No. | Space Velocity Hours$^{-1}$ | Catalyst Temp. °C. | COS Inlet g./100 ft.$^3$ | $H_2S$ Outlet p.p.m. |
|---|---|---|---|---|
| 1 | 500 | 435 | 300 | 1 |
| 2 | 400 | 440 | 300 | Nil |
| 3 | 400 | 450 | 690 | 7 |
| 4 | 730 | 450 | 300 | 11-12 |

It will be seen that the catalyst used is suitable for conversion of COS to $H_2S$ when used at a S.V. of 500 hrs.$^{-1}$ or below with a catalyst temperature of about 400° C.

I claim:

1. A process for the treatment of inorganic gases to remove carbon oxysulphide therefrom, said process comprising the steps of contacting a mixture of steam and the gases to be treated, with a catalyst material comprising from 5 to 20 percent by weight based on the weight of the catalyst material of an oxide of uranium, whereby the sulphur present in the carbon oxysulphide is converted into hydrogen sulphide.

2. A process as claimed in claim 1 wherein the catalyst material is supported on an aluminum oxide carrier.

3. A process as claimed in claim 2 wherein an uranium compound which is converted to the uranium oxide when exposed to gases to be treated is formed on the aluminium oxide carrier.

4. A process as claimed in claim 1 wherein the amount of uranium oxide present is about 10 percent by weight based on the weight of the catalyst material.

* * * * *